F. E. DAVIS & W. W. CAMERON.
FLEXIBLE HARROW.
APPLICATION FILED FEB. 25, 1913.
1,067,506.
Patented July 15, 1913.
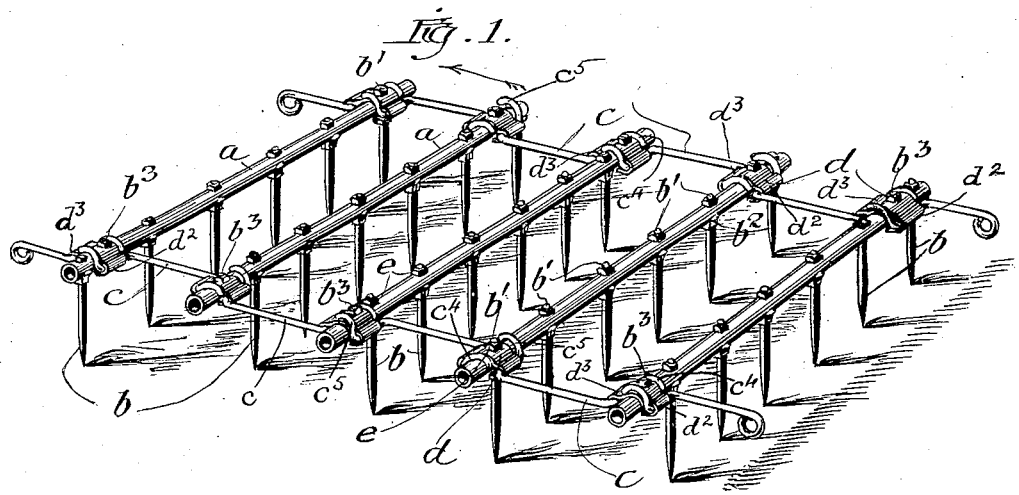
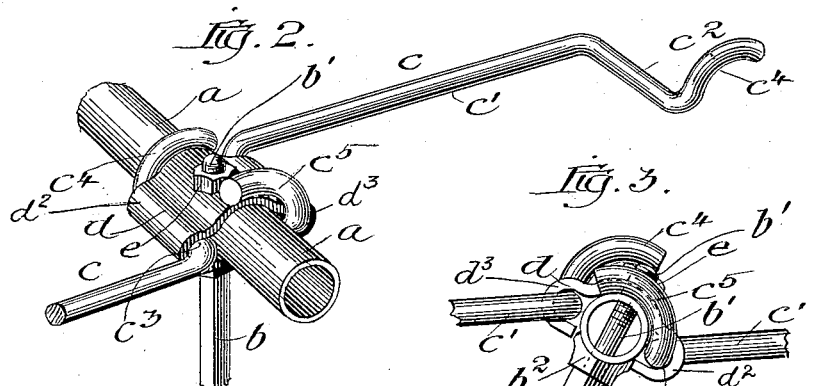
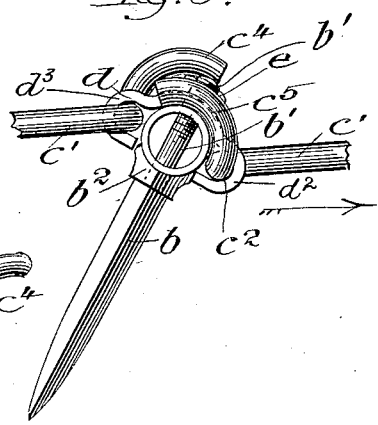
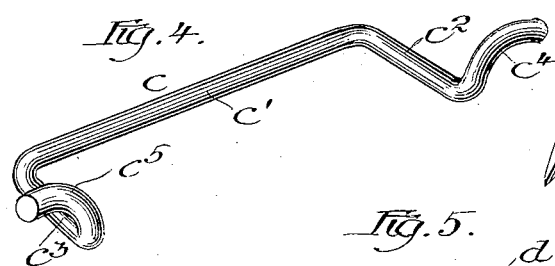
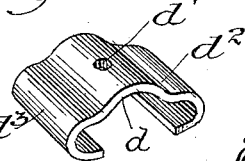
Witnesses:
Frank J. Blanchard
Mildred Stumpf
Inventors:
Frank E. Davis & William W. Cameron
By Fred Gerlach
Their Attorney.

UNITED STATES PATENT OFFICE.

FRANK E. DAVIS AND WILLIAM W. CAMERON, OF LA CROSSE, WISCONSIN, ASSIGNORS TO LA CROSSE PLOW CO., OF LA CROSSE, WISCONSIN, A CORPORATION OF WISCONSIN.

FLEXIBLE HARROW.

1,067,506. Specification of Letters Patent. Patented July 15, 1913.

Application filed February 25, 1913. Serial No. 750,494.

*To all whom it may concern:*

Be it known that we, FRANK E. DAVIS and WILLIAM W. CAMERON, both residents of La Crosse, in the county of La Crosse and State of Wisconsin, have invented new and useful Improvements in Flexible Harrows, of which the following is a full, clear, and exact description.

The invention relates to flexible harrows of that type in which the tooth-carrying bars are serially and flexibly connected by links.

The invention designs to provide an improved harrow of this type in which the links flexibly connecting the bars may be formed of wrought metal or rods and are provided with stops for engaging the tooth-bars.

A further object of the invention is to provide an improved harrow in which the links for connecting the tooth bars are formed of wrought metal, and permit the teeth to occupy different positions according to the directions of draft.

Other objects of the invention will be obvious from the construction hereinafter set forth.

The invention consists in the several novel features hereinafter set forth and more particularly defined by claims at the conclusion hereof.

In the drawings: Figure 1 is a perspective of a harrow embodying the invention. Fig. 2 is a perspective of one of the connections between a tooth-bar and a pair of links. Fig. 3 is a side elevation of the same, the tooth being shown in position assumed when the draft is applied to cause the tooth to remain angular relatively to a vertical line. Fig. 4 is a detail perspective of one of the links, Fig. 5 is a perspective of one of the attaching-clips.

The harrow bars $a$ may be in the form of pipes or tubes and teeth $b$ are secured thereto in properly spaced relation in any suitable manner. The harrow bars are serially connected at their ends by flexible connections comprising links $c$ and clips $d$. Each clip $d$ is preferably formed of a flat bar bent as at $d'$ to form a seat for the tubular bar $a$ which serves to hold the clip against horizontal turning. At each side of the toothed bar, each clip is formed with a transversely extending loop or seat $d^2$ and $d^3$ respectively. Each clip $d$ is secured to a harrow-bar by a nut $e$ on the screw-threaded shank $b'$ of one of the teeth $b$, or by an ordinary bolt $b^3$ extending through the bar. Each tooth is provided with a suitable shoulder or stop $b^2$ and the shank $b'$ extends diametrically through the tooth-bar. Each link $c$ comprises a longitudinally extending portion $c'$, a transversely extending pivot portion $c^2$ at one end which is adapted to pass through and be held in the loop or seat $d^3$ of one of the clips $d$ and another transversely extending pivot-portion $c^3$ which fits in and is held in loop or seat $d^2$ of the clip $d$ on the next harrow-bar of the series. One end of each link is formed with a curved integral extension $c^4$ which is adapted to overlie and engage one of the harrow-bars $a$ and the opposite end of the links is formed with a similar, but oppositely extending integral portion $c^5$ which is adapted to engage the harrow-bar $a$ to which the pivot $c^3$ is connected. These integral portions $c^4$ and $c^5$ extend outwardly and longitudinally from the pivots of the links and serve as stops for limiting the pivotal movement of the harrow-bars relatively to the links or line of draft, and these stops are relatively disposed so that the harrow-teeth will remain in vertical position when the draft is applied to one end of the harrow and to remain in a rearwardly angled position when the draft is applied to the other end of the harrow. For example, when the harrow is being operated in the direction of the arrow (Fig. 1), stops $c^4$ will engage the harrow bars and stop relative pivotal movement between the harrow-bars and the links. When the harrow-teeth are vertical, the stops $c^5$ at the other end of the links will then be separated from the bars, and resultantly the harrow-teeth will be operated in substantially vertical position, although the pivotal connections permit the bars to rise and fall relatively to one another to accommodate the harrow to irregularities in the ground. When the direction of the draft is reversed to that indicated by the arrow in Fig. 3, the rear ends $c^5$ of links $c$ will abut against the harrow-bar when the teeth are inclined rearwardly, as shown in Fig. 3 and thus serve as stops for causing the teeth to be operated in an angular position. At such time, the front ends $c^4$ will be free or separated from the harrow-bar and will permit the limited flexibility desired. Any suitable draft-connection may be employed for the front and rear harrow-bars as well understood in the art.

The invention thus exemplifies an improved harrow in which the links themselves are formed to serve as stops co-acting with the bars to cause the teeth to be operated in definite relation to the links and in different positions, according to the direction of the draft. It is unnecessary to form eyes or loops on the ends of the links as in some prior constructions and in this manner the cost of manufacture is materially reduced. The links and the attaching clips may both be formed of wrought metal or bars, so that practically the entire structure may be of wrought metal.

The invention is not to be understood as restricted to the details set forth, since these may be modified within the scope of the appended claims without departing from the spirit and scope of the invention.

Having thus described the invention, what we claim as new and desire to secure by Letters Patent, is:

1. A flexible harrow comprising bars having teeth thereon, and links pivotally connected to the bars and formed with stops thereon extended to engage the bars at the opposite ends of the links to limit relative pivotal movement between the links and the bars.

2. A flexible harrow comprising bars having teeth thereon, and links pivotally connected to the bars at the sides thereof and formed with stops thereon extended to engage the bars at the opposite ends of the links and to limit relative pivotal movement between the links and the bars.

3. A flexible harrow, comprising bars having teeth thereon, links for flexibly connecting the bars, clips secured to the bars in which the links are pivoted, said links being formed with stops thereon for engaging the bars to limit relative pivotal movement between the links and the bars.

4. A flexible harrow comprising bars having teeth thereon and links pivotally connected to the bars and formed with a stop at their opposite ends extended to overlie the bars respectively, for limiting relative pivotal movement between the links and the bars.

5. A flexible harrow comprising bars having teeth thereon, clips secured to the bars, and links pivotally connected to said clips and formed with integral stops extended to overlie the bars respectively and for limiting relative pivotal movement between the links and the bars.

6. A flexible harrow comprising bars having teeth thereon, clips secured to the bars and having a seat at each side thereof, and links for connecting the bars having transversely integral extending portions held in the seats in the clips respectively, and integral stops on the links extended into position to engage the bars and limit relative pivotal movement between the links and the bars.

7. A flexible harrow comprising bars having teeth thereon, and links pivotally connected to the bars and formed with stops thereon extended to engage the bars at the opposite ends of the links and to limit relative pivotal movement between the links and the bars, the stops at the opposite ends of the links being disposed to permit the teeth to assume different working positions according to the direction of draft.

8. A flexible harrow, comprising bars having teeth thereon, links for flexibly connecting the bars, clips secured to the bars in which the links are pivoted, said links being formed with stops thereon for engaging the bars to limit relative pivotal movement between the links and the bars, the stops at the opposite ends of the links being disposed to permit the teeth to assume different working positions according to the direction of draft.

9. A flexible harrow comprising bars having teeth thereon and links pivotally connected to the bars and formed with a stop at their opposite ends extended to overlie the bars respectively, for limiting relative pivotal movement between the links and the bars, the stops at the opposite ends of the links being disposed to permit the teeth to assume different working positions according to the direction of draft.

10. A flexible harrow comprising bars having teeth thereon, clips secured to the bars and having a seat at each side thereof, and links for connecting the bars, having transversely integral extending portions held in the seats in the clips respectively, and integral stops on the links extended into position to engage the bars and limit relative pivotal movement between the links and the bars, the stops at the opposite ends of the links being disposed to permit the teeth to assume different working positions according to the direction of draft.

11. A flexible harrow comprising bars having teeth thereon, clips formed of a flat bar bent to form a loop at each side of the bar, links connecting the clips having transversely extending pivots held in said loops and having their terminals bent to overlie the bar and form stops for limiting relative pivotal movement of the links and the bars.

FRANK E. DAVIS.
WILLIAM W. CAMERON.

Witnesses:
C. F. SUTOR,
H. W. ROBINSON.

Copies of this patent may be obtained for five cents each, by addressing the "Commissioner of Patents, Washington, D. C."